United States Patent [19]

Hagenbuch

[11] Patent Number: 5,224,761
[45] Date of Patent: Jul. 6, 1993

[54] BOTTOM DUMP FRONT DOOR LATCH

[76] Inventor: LeRoy G. Hagenbuch, 502 W. Northgate Rd., Peoria, Ill. 61614

[21] Appl. No.: 821,970

[22] Filed: Jan. 15, 1992

[51] Int. Cl.⁵ .............................................. B65G 65/30
[52] U.S. Cl. ..................................... 298/28; 248/27; 105/282.1; 105/289
[58] Field of Search ............................ 298/27, 28, 38; 105/282.1, 289, 290; 222/483, 485

[56] References Cited

U.S. PATENT DOCUMENTS

| | | | |
|---|---|---|---|
| 2,816,797 | 12/1957 | Hanson | 298/28 |
| 3,347,174 | 10/1987 | Floehr | 105/289 |
| 3,536,013 | 10/1970 | Nagy | 298/28 |
| 3,712,249 | 1/1973 | Nagy et al. | 105/282.1 |
| 4,024,939 | 5/1977 | Grieshop et al. | 222/483 |

FOREIGN PATENT DOCUMENTS 2155551  5/1973  Fed. Rep. of Germany ........ 298/27

OTHER PUBLICATIONS

A portion of a blueprint illustrating a bottom dump vehicle which was sold by Philippi-Hagenbuch, Inc.

Primary Examiner—Michael S. Huppert
Assistant Examiner—Gregory A. Morse
Attorney, Agent, or Firm—Leydig, Voit & Mayer

[57] ABSTRACT

A bottom dump trailer having a trailer body for accepting and hauling load material having a front and rear walls, opposing and parallel side walls and a floor formed by front and rear doors is disclosed. The sides of the front and rear doors are slidably mounted on the side walls of the trailer body so that the doors can slide between the front and rear of the trailer body. In order to dump the load material, a hydraulic cylinder connected between the trailer frame and the rear door slides the rear door from the rear to the front of the trailer body, dumping the load material from the rear of the trailer body. The second hook end of a latch member pivotally attached to the front door hooks to a pin attached to the rear door thereby attaching the front door to the rear door so that the doors may slide in unison between the front and rear of the trailer body. The hydraulic cylinder slides the rear door and the attached front door to the rear of the trailer body, dumping the load material from the front of the trailer body. In order to close the front and rear doors, the hydraulic cylinder slides the rear door and the attached front door to the front of the trailer body where an air cylinder extends a piston rod which engages and rotates the first hook end of the latch member to hook a pin attached to the trailer frame while disengaging the second hook end from the rear door pin thereby preventing the front door from sliding with the rear door. The hydraulic cylinder then slides the rear door to the rear of the trailer body, closing the rear door.

16 Claims, 4 Drawing Sheets

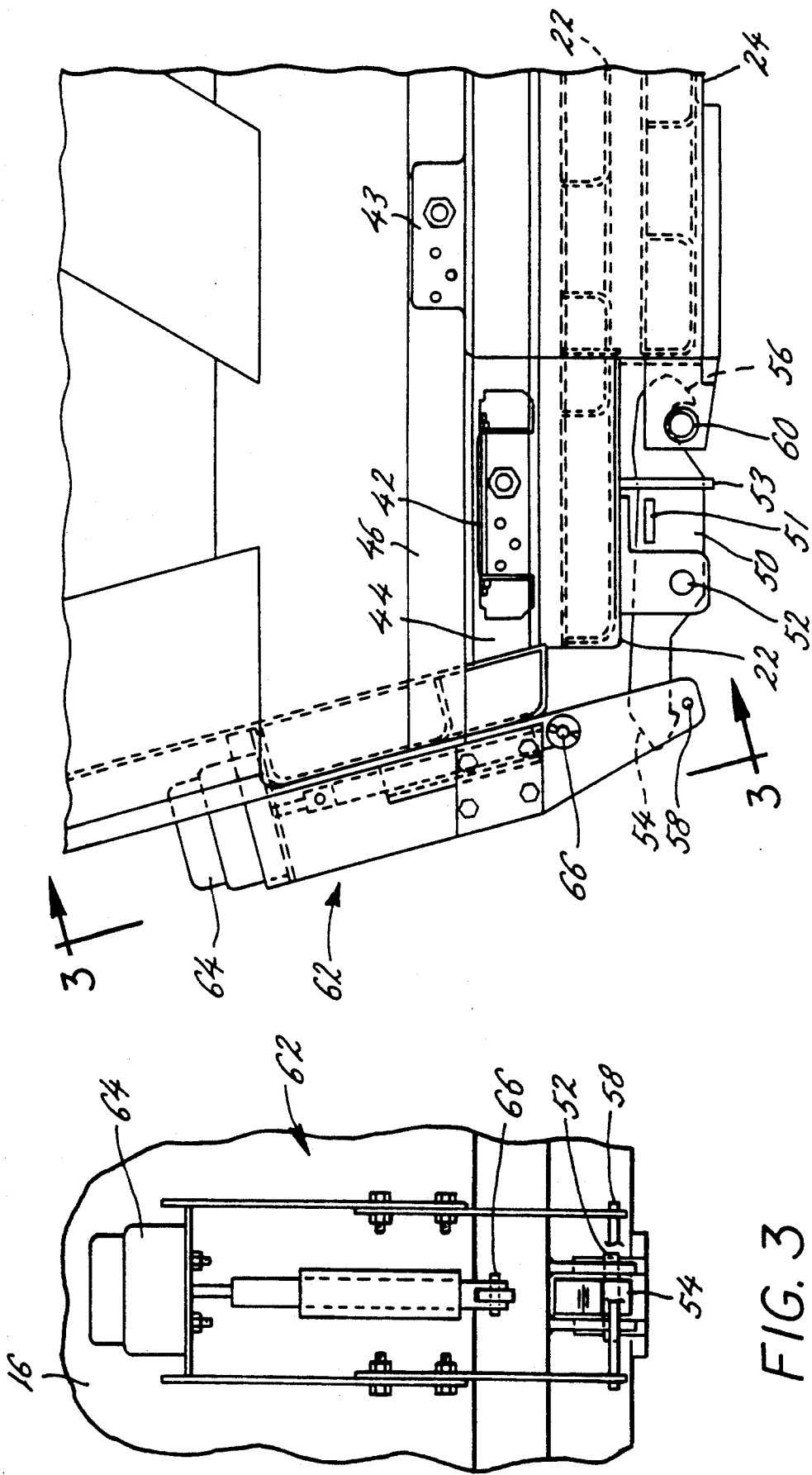

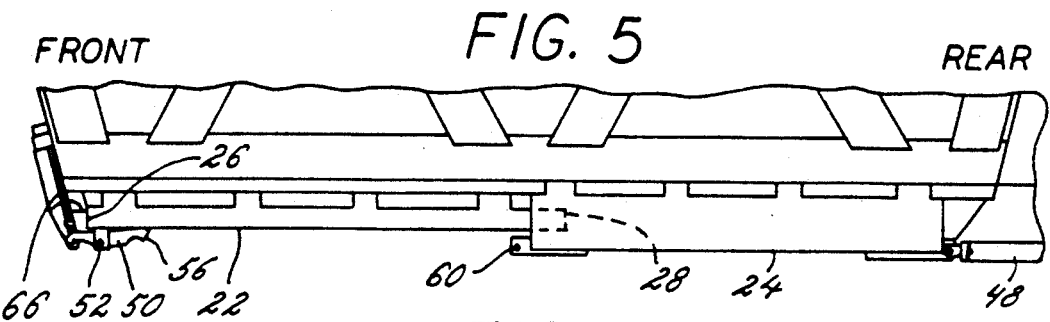
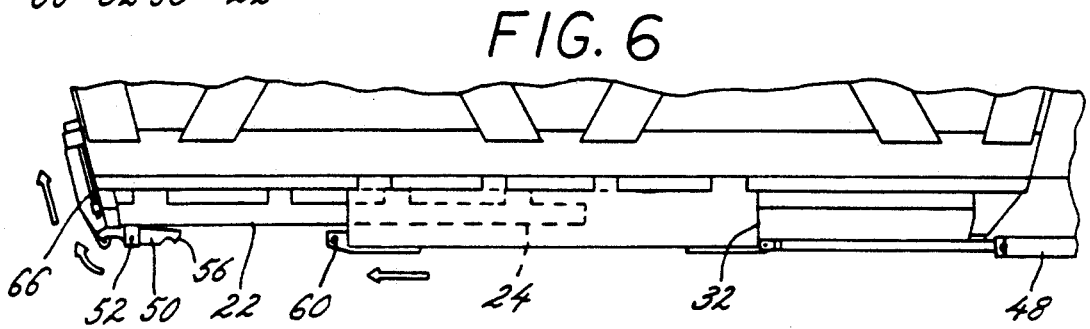
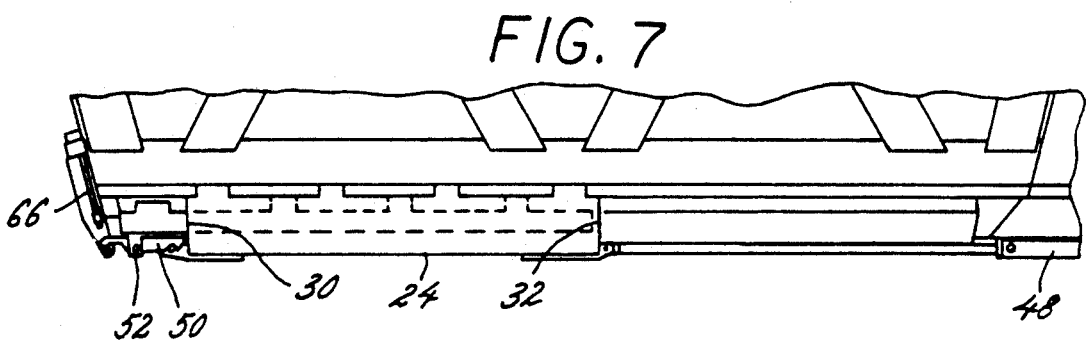
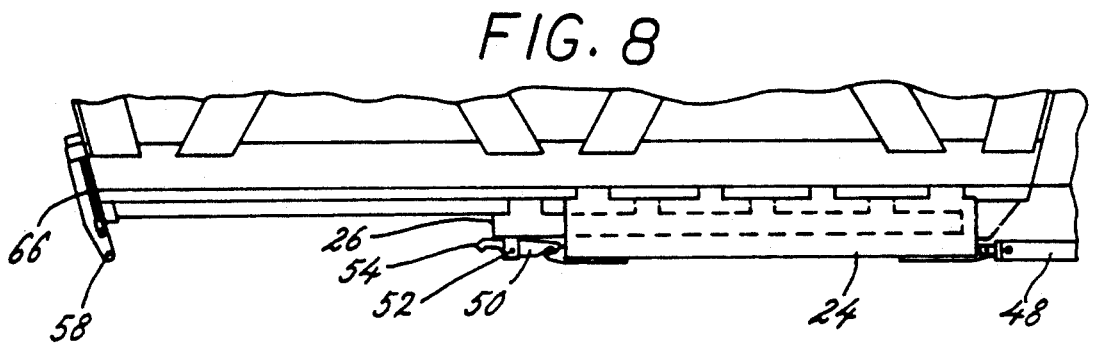
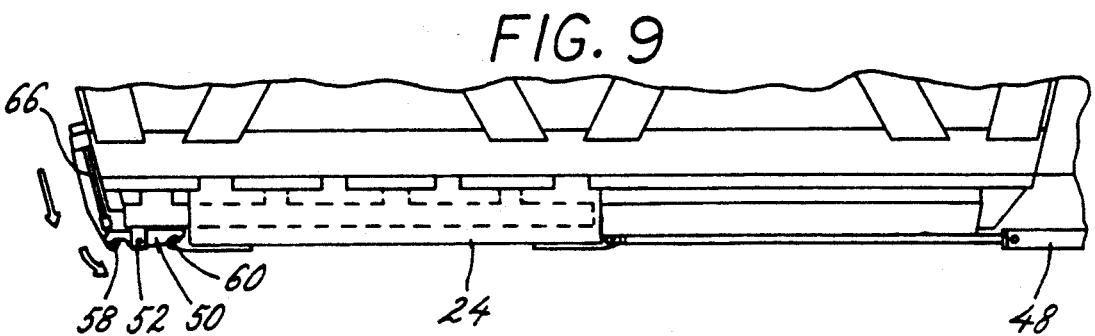

BOTTOM DUMP FRONT DOOR LATCH

FIELD OF THE INVENTION

The present invention relates generally to bottom dump trailers and more particularly to a bottom dump trailer door latch assembly.

BACKGROUND OF THE INVENTION

Bottom dump trailers have been utilized to haul and transport ash or other load materials. However, the design of typical bottom dump trailer doors has presented certain obstacles to ash haulage. In conventional bottom dump trailers, the bottom dump doors pivot outwardly to unload the ash. Unfortunately, this type of bottom dump trailer leaves substantial quantities of ash in the trailer body that requires additional time and equipment to unload. Furthermore, conventional bottom dump trailer doors are not designed to accommodate the varying material consistencies characteristic of ash hauling.

In order to overcome this problem, bottom dump ash trailers have utilized doors which extend along the bottom width of the trailer and open the full width of the trailer by sliding along the longitudinal axis of the bottom dump trailer. Typically, the bottom dump ash trailer will have rear and front doors which transport and unload the load material from the rear and front portions of the trailer body, respectively. During dumping, the front and rear doors slide along the longitudinal axis of the bottom dump trailer in order to open and unload the load material. Heretofore, dumping of the ash or other load material using these sliding doors has proven to be relatively difficult, inefficient and cumbersome to operate, requiring numerous operational steps to lock and unlock each individual door and to slide each door open to dump the load material. In addition, each step in the dumping procedure required several components to operate which have proven expensive and time consuming to install and maintain.

OBJECTS AND SUMMARY OF THE INVENTION

Accordingly, it is an object of the present invention to provide a bottom dump ash trailer having an assembly which operates the front and rear doors to perform the dumping procedure quickly and efficiently.

It is another object to provide a bottom dump ash trailer having an assembly operating the front and rear doors which can be quickly and easily installed and maintained.

It is a related object to provide a bottom dump ash trailer having an assembly operating the front and rear doors requiring a minimum number of components to operate the dumping procedure.

Accordingly, the present invention is generally directed to a bottom dump ash trailer. The invention provides unique structural features which permit the dumping procedure to be operated quickly and efficiently.

In the preferred embodiment, there is provided a bottom dump ash trailer having a trailer body comprised of a front and rear wall and a floor formed by a front and rear door. Each door has opposing and parallel first and second ends and opposing and parallel sides. The sides of the front and rear doors are slidably mounted for movement on the side walls of the trailer body so that the front and rear doors can slide between the front and rear of the trailer body.

In order to permit the front and rear doors to slide between the front and rear of the trailer body, the sides of the front and rear doors, extending upwardly from the doors, have roller assemblies mounted thereon adapted to slidably engage tracks located on the side walls of the trailer body.

In order to slide the rear door along the tracks between the front and rear of the trailer body, a hydraulic cylinder is connected between the second end of the rear door and the trailer frame. It will be appreciated that the load material is dumped from the rear of the trailer body when the rear door is moved from its closed position at the rear of the trailer body to its open position at the front of the trailer body.

A latch member having first and second hook ends is pivotally attached to the first end of the front door for movement between first and second positions. In the first position, the first hook end hooks a pin attached to the trailer frame to prevent the front door from sliding between the front and rear of the trailer body. In the second position, the second hook end hooks to a pin attached to the first end of the rear door to permit the front door to slide from the front to the rear of the trailer body in unison with the rear door. It will be appreciated that the load material is dumped from the front of the trailer body when the front door is moved from its closed position at the front of the trailer body to its open position at the rear of the trailer body.

In order to rotate the latch member between the first and second positions, an air cylinder for extending a piston rod is provided. In order to position the latch member in its first position to prevent the front door from sliding between the front and rear of the trailer body, the piston rod is extended by the air cylinder to engage and rotate the first hook end to hook the trailer frame pin. In order to position the latch member in its second position to permit the hydraulic cylinder to slide the front and rear door in unison from the front to the rear of the trailer body, the piston rod is retracted, permitting the second hook end to hook the rear door pin.

In order to dump the load material, the hydraulic cylinder moves the rear door from its closed position at the rear of the trailer body to its open position at the front of the trailer body, permitting the load material at the rear of the trailer body to be dumped. While the rear door is at the front of the trailer body, the air cylinder retracts the piston rod, permitting the second hook end of the latch member to engage and hook the rear door pin so that the front and rear doors are locked together for movement in unison. The hydraulic cylinder then slides the rear door and the attached front door at the rear of the trailer body so that the load material can be dumped from the front of the trailer body.

In order to close the front and rear doors for accepting load material, the hydraulic cylinder slides the rear door with the attached front door to the front of the trailer body. With the piston rod extended, the piston rod engages and rotates the first hook end of the latch member to hook the trailer frame pin and disengages the second hook end from the rear door pin, thereby preventing the front door from sliding between the front and rear of the trailer body. The hydraulic cylinder then slides the rear door to its closed position at the rear of the trailer body.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is an enlarged and partial side view of the latch assembly of FIG. 1 showing the latch member locking the front and rear door together so they can slide between the front and rear of the trailer body in unison;

FIG. 3 is a front elevational view of the latch assembly of FIG. 2;

FIG. 5 is an enlarged and partial side elevational view of FIG. 1 showing the front and rear doors in their closed positions for accepting and transporting the load material;

FIG. 6 is an enlarged and partial side elevational view of FIG. 1 showing (1) the front door in its closed position at the front of the trailer body and (2) the rear door as moving to its open position at the front of the trailer body for dumping the load material from the rear of the trailer body;

FIG. 7 is an enlarged and partial side elevational view of FIG. 1 showing (1) the front door in its closed position at the front of the trailer body, (2) the rear door in its open position at the front of the trailer body having dumped the load material from the rear of the trailer body, and (3) the latch member hooking the front and rear doors together so that they can slide between the front and rear of the trailer body in unison;

FIG. 8 is an enlarged and partial side elevational view of FIG. 1 showing (1) the front door in its open position at the rear of the trailer body having dumped the load material from the front of the trailer body and (2) the rear door in its closed position at the rear of the trailer body; and FIG. 9 is an enlarged and partial side elevational view of FIG. 1 showing (1) the front door in its closed position at the front of the trailer body, (2) the rear door in its open position at the front of the dump for dumping the load material from the rear of the trailer body, and (3) the latch member hooking the pin attached to the trailer frame for preventing the front door from sliding between the front and rear of the trailer body.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
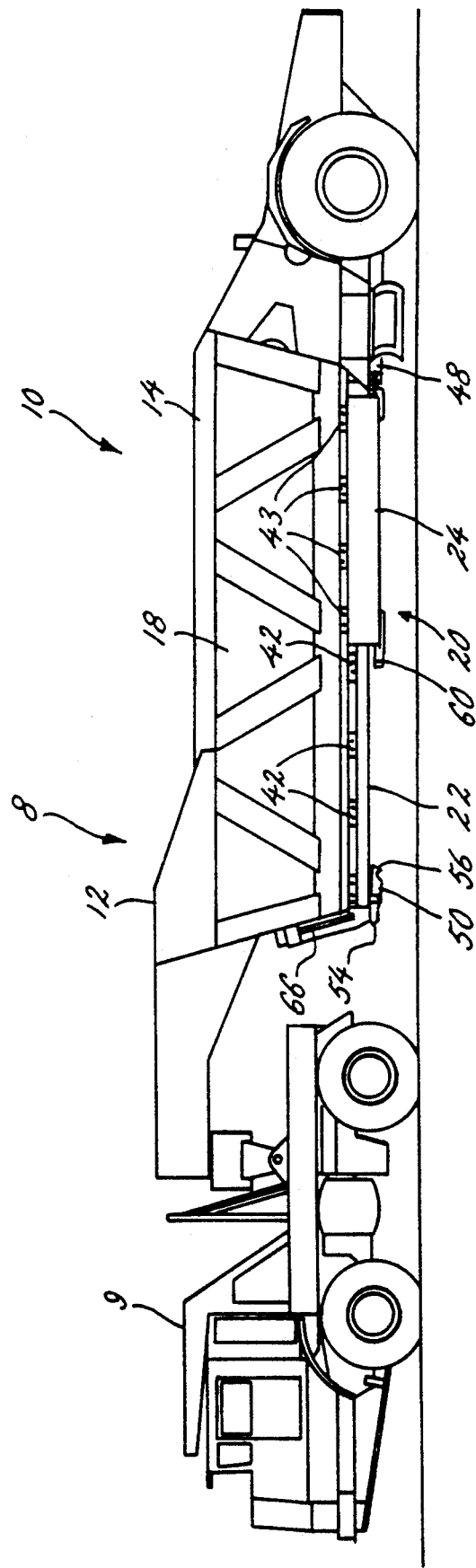
FIG. 1 is a side elevational view of a bottom dump ash trailer according to the present invention.

Referring to FIG. 1, there is shown a side elevational view of a bottom dump vehicle 8. The bottom dump vehicle 8 has a tractor 9 and a trailer 10. The trailer 10 has a trailer frame 12 supporting a trailer body 14 for receiving and transporting load material such as ash but which may include other load materials. As best illustrated in FIG. 4, the trailer body 14 has a front wall 16, a rear wall 17, opposing and parallel side walls 18, and a floor 20 formed by a front door 22 and a rear door 24.

The trailer body 14 also has a internal wall (not shown) separating the trailer body 14 and the load material between front and rear portions which are emptied by front and rear doors 22, 24, respectively. As will be seen in FIG. 4, the front door 22 has opposing and parallel first end 26 and second end 28 and opposing and parallel sides 30, 32. Similarly, the rear door 24 has opposing and parallel first end 34 and second end 36 and opposing and parallel sides 38, 40.

Figure 4:
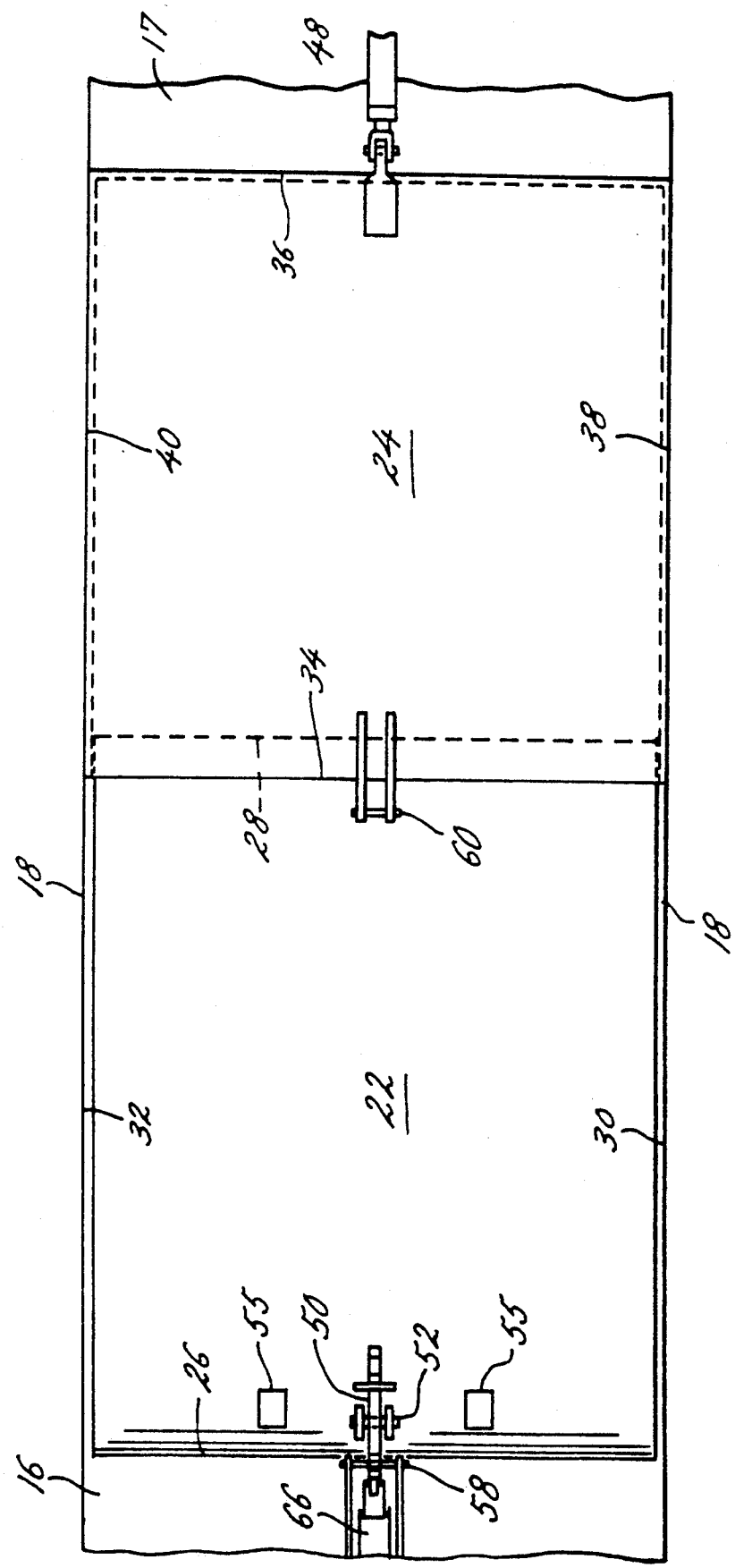
FIG. 4 is a bottom view of the front and rear doors in their closed positions.

In order to form a substantially continuous floor 20 for receiving and transporting load material, it will be seen in FIG. 4 that the first end 26 of the front door 22 engages the front wall 16, the second end 28 of the front door 22 engages the first end 34 of the rear door 24, and the second end 36 of the rear door 24 engages the rear wall 17.

It will be appreciated that the front and rear doors 22, 24 have open positions for dumping the load material and closed positions for receiving and transporting the load material. The front door 22 is in its closed position as shown in FIGS. 1, 4–7 and 9 when its first end 26 engages the front wall 16 and the front door 22 is in the front of the trailer body 14. The front door 22 is in its open position as shown in FIG. 8 when its second end 28 engages the rear wall 17 and the front door 22 is at the rear of the trailer body 14. In contrast, the rear door 24 is in its closed position as shown in FIGS. 1, 4, 5 and 8 when its second end 36 engages the rear wall 17 and the rear door 24 is at the rear of the trailer body 14. The rear door 24 is in the open position as shown in FIGS. 2, 7 and 9 when the rear door is positioned at the front of the trailer body 14.

In order to permit the front and rear doors 22, 24 to slide between their respective open and closed positions, the sides 30, 32 of the front door 22 and the sides 38, 40 of rear door 24 are slidably mounted for movement on the side walls 18 of the trailer body 14. The sides 30, 32 of the front door 22 and the sides 38, 40 of rear door 24, extending upwardly from the doors 22, 24, have roller assemblies generally depicted at 42, 43 which slidably engage tracks 44, 46 located on the side walls 18. The tracks 44, 46 slidably receive the roller assembly 42, 43. In the preferred embodiment illustrated in FIG. 2, the tracks 44, 46 are parallel and substantially next to each other. The sides 30, 32 of the front door 22 and the associated roller assembly 42 engage and slide within the lower track 44 and the sides 38, 40 of the rear door 24 and the associated roller assembly 43 engage and slide within the upper track 46.

Means for sliding the front and rear doors 22, 24 between the front and rear of the trailer body is provided. In the preferred embodiment, a hydraulic cylinder 48, connected between the trailer frame 12 and the second end 36 of the rear door 24, slides the front and rear doors 22, 24 between the front and rear of the trailer body 14. When the hydraulic cylinder 48 extends, the rear door 24 is pushed by the stop members 55 to the front end of the trailer body 14 as shown in FIGS. 7 and 9, and when the hydraulic cylinder 48 retracts, the rear door 24 is pulled to the rear of the trailer body 14 as shown in FIGS. 4, 5 and 8.

In accordance with one of the objects of the invention, a latch assembly comprising a latch member 50, pins 58, 60 and an air cylinder 64 is provided. The latch member 50 is pivotally attached at pin 52 located at the first end 26 of the front door 22 and between the sides 30, 32 of the front door 22 as shown in FIG. 4. The latch member 50 has first and second hook ends 54, 56, best illustrated in FIG. 2, which can rotate about pin 52 between first and second positions. The first hook end 54 can hook pin 58 attached to the trailer frame 12 and the second hook end 56 can hook pin 60 attached to the first end 34 of the rear door 24. In the first position, the latch member 50 is rotated counter-clockwise so that the first hook end 54 securely engages the trailer frame pin 58 to prevent the front door 22 from sliding along the side walls 18 of the trailer body 14. In the second position, the latch member 50 is rotated clockwise so that the second hook end 56 securely engages the rear door pin 60. It will be appreciated that, in the second position, the first end 26 of the front door 22 will be securely attached to the first end 34 of the rear door 24 so that the front and rear doors 22, 24 will slide in unison between the front and rear of the trailer body 14. The latch member 50 is designed so that the weight of the second hook end 56 will automatically force the latch member 50 to rotate clockwise to the second position unless it is otherwise controlled.

Means for rotating the latch member 50 between the first and second positions is provided. The rotating means may be located on the trailer frame 12 or the front door 22. In the preferred embodiment shown in FIG. 3, the rotating means comprises an air cylinder 64 attached to the front wall 16 of the trailer body 14 which moves a piston rod 66. When the piston rod 66 is extended by the air cylinder 64, it engages the first hook end 54, thereby forcing the latch member 50 to rotate counter clockwise to the first position. As noted previously, in the first position, the first hook end 54 engages the trailer frame pin 58 and prevents the front door 22 from sliding between the front and rear of the trailer body 14. When the piston rod 66 is retracted by the air cylinder 64, the latch member 50 automatically through gravity rotates clockwise to its second position wherein the second hook end 56 engages the rear door pin 60 and permits the front and rear doors 22, 24 to move in unison.

Upon reference to FIG. 2, it will be appreciated that the rotation of the latch member 50 must be limited between its first and second positions to prevent damage to the latch assembly and the trailer frame 12. The first hook end 54 must not be permitted to fall below the level of the trailer frame pin 58 or rise above the level of retracted position of the piston rod 66. Otherwise, the first hook end 54 will damage pin 58 or piston rod 66 as it slides to the front of the trailer body 14, causing damage to the latch assembly and trailer frame 12. For similar reasons, the second hook end 56 must not be permitted to fall below the level of the rear door pin 60. Thus, means for limiting the rotation of the latch member 50 between the first and second positions is provided. In the preferred embodiment, the limiting means is provided by a top stop member 51 and bottom stop member 53 illustrated in FIG. 2. The top stop member 51 is a pawl positioned on the latch member 50 to limit the upward rotation of the second hook end 56 and therefore, the downward rotation of the first hook end 54. The bottom stop member 53 extends from the front door 22 and limits the downward rotation of the second hook end 56 and also the upward rotation of the first hook end 54. The top stop member 51 and the bottom stop member 53 therefore prevent the latch member 50 from rotating beyond its first and second positions. In other embodiments, it will be appreciated that the top stop member 51 and the bottom stop member 53 may also be attached to the truck frame 12 or the front door 22.

In order to prevent further damage to the latch assembly and trailer frame 12, in the event of misalignment between the latch member 50 and the trailer frame pin 58, the trailer frame pin 58 is also designed to break or break before appreciable damage can be caused by this contact.

In order to dump the load material from the bottom dump ash trailer 12, it will be appreciated that the front and rear doors 22, 24 must be positioned from their respective closed positions in FIG. 4-5 to their respective open positions. In order to dump the load material from the rear of the trailer body 14, the hydraulic cylinder 48 slides the rear door 24 from its closed position at the rear of the trailer body 14 as shown in FIG. 5 to its open position at the front of the trailer body 14 as shown in FIG. 7. It will be appreciated that the load material located in the rear of the trailer body 14 will fall out of the trailer body 14 through the opening created by the rear door 24 moving forward In order to dump the load material from the front of the trailer body 14, the piston rod 66 of air cylinder 64 is retracted as shown by the arrows in FIG. 6 before the rear door 22 reaches the front of the trailer body 14, so that latch member 50 rotates from its first position, preventing the front door 22 from moving to its second position, permitting the front door 22 to slide in unison with the rear door 24 from the front to the rear of the trailer body 14. The rotation of latch member 50 is controlled by stop member 53 to position the second hook end of the latch 50 to be able to properly engage pin 60. As the rear door 24 slides to the forward and open position, shown in FIG. 6, the pin 60 located at the first end 34 of the rear door 24 engages the latch member 50 causing the second hook end 56 to securely engage the rear door pin 60 as shown in FIGS. 2 and 7. Once the second hook end 56 securely engages the rear door pin 60, the first end 26 of the front door 22 is substantially locked to the first end 34 of the rear door 24. The hydraulic cylinder 48 then slides the rear door 24 and the attached front door 22 from the front of the trailer body 14 to the rear of the trailer body 14 as shown in FIG. 8.

Similarly, in order to receive and transport load material, the front and rear doors 22, 24 must be in their respective closed positions. In order to close the front door 22, the hydraulic cylinder 48 slides the rear door 24 to the front of the trailer body 14 simultaneously moving the front door 22 to its closed position at the front of the trailer body 14, as shown in FIG. 9. Upon reference to FIG. 4, it will be appreciated that the first end 36 of the rear door 24 engages and pushes a stop member 55, rigidly attached to the front door 22 in order to push the front door 22 to the front of the dump body 14. The rotation of the latch member 50 is controlled by stop member 51 to position the first hook end to be able to properly engage pin 58. While the rear door 24 is positioned at the front of the trailer body 14, the air cylinder 64 extends the piston rod 66 as shown by the arrows in FIG. 9, rotating the latch member 50 to the first position wherein the second hook end 56 disengages from the rear door pin 60 and the first hook end 54 engages the trailer frame pin 58 to hold the front door 22 in its closed position. The hydraulic cylinder 48 then slides the rear door 24 to its closed position at the rear of the trailer body 14, as shown in FIG. 5, so that a substantially continuous and closed floor 20 is formed for accepting a load.

I claim as my invention:

1. A bottom dump trailer for accepting and hauling load material comprising:
   a trailer frame supporting a trailer body for accepting the load material having front and rear walls, two opposing and parallel side walls;
   front and rear doors, each door having opposing and parallel first and second ends and opposing and parallel sides slidably mounted on the side walls for movement between an open position for dumping the load material and a closed position for receiving the load material, and a floor formed by the first end of the front door engaging the front wall, the second end of the front door engaging the first end of the rear door and the second end of the rear door engaging the rear wall in the closed position;
   a hydraulic cylinder connected between the trailer frame and the second end of the rear door for sliding the rear door between the rear and front of the trailer body to dump the load material from the rear of the trailer body;
   a latch member pivotally attached to the first end of the front door for movement between first and second positions having a first hook end for hooking a pin attached to the trailer frame in the first position to prevent the front door from sliding between the front and rear of the trailer body and a second hook end for hooking a pin attached to the first end of the rear door in the second position to permit the hydraulic cylinder to slide the rear door and the attached front door between the front and rear of the trailer body to dump the load material from the front of the trailer body; and
   means for rotating the latch member between the first and second positions.

2. The bottom dump trailer according to claim 1 wherein the rotating means comprises an air cylinder attached to the front wall having a piston rod which can extend to engage and force the first hook end to hook the pin attached to the trailer frame and can retract so that the second hook end can hook the pin attached to the rear door.

3. The bottom dump trailer according to claim 1 wherein the sides of the front and rear doors, extending upwardly from the door, have a roller assembly for slidably engaging a plurality of tracks located along the side walls of the trailer body to permit the front and rear doors to slide between the front and rear of the trailer body.

4. The bottom dump trailer according to claim 1 comprising means for defining the end points of the rotation of the latch member between the first and second positions.

5. The bottom dump trailer according to claim 4 wherein the means for defining the end points comprises a top stop member to prevent the first hook end from rotating below the pin attached to the trailer frame and a bottom stop member to prevent the second hook member from rotating below the pin attached to the rear door.

6. A bottom dump trailer according to claim 5 wherein the top stop member and the bottom stop member are attached to the latch member.

7. A trailer for accepting and hauling load material comprising:
   a front and rear door forming the floor of the trailer and capable of movement between the front and rear of the trailer to receive and dump the load material, means for moving the front and rear doors between the front and rear of the trailer attached between the trailer and one of the doors,
   a latch member pivotally attached to one of the doors for movement between first and second positions, the latch member having a first hook end for hooking a pin attached to the trailer in the first position to prevent the one door from sliding between the front and rear of the trailer and a second hook end for hooking a pin attached to the other door in the second position to permit the moving means to move both doors between the front and rear of the trailer body to dump the load material from the dump body; and
   means for rotating the latch member between the first and second positions attached to the trailer.

8. The trailer according to claim 7 wherein the rotating means comprises an air cylinder having a piston rod which can extend to engage and force the first hook end to hook the pin attached to the trailer and can retract so that the second hook end can hook the pin attached to the other door.

9. The trailer according to claim 7 comprising means for defining the end points of the rotation of the latch member between the first and second positions.

10. The trailer according to claim 9 wherein the means for defining the end points comprises a top stop member to prevent the first hook end from rotating below the pin attached to the trailer and a bottom stop member to prevent the second hook member from rotating below the pin attached to the door.

11. The trailer according to claim 10 wherein the top stop member and the bottom stop member are attached to the latch member.

12. The trailer according to claim 7 wherein the latch member is attached to the front door.

13. The trailer according to claim 7 wherein the moving means is attached to the rear door.

14. The trailer according to claim 7 wherein the latch member is attached to the front door and the moving means is attached to the rear door.

15. The trailer according to claim 7 wherein the moving means comprises a hydraulic cylinder.

16. A method for unloading a bottom dump trailer having a trailer frame, a trailer body for accepting load material having front and rear walls, two opposing and parallel side walls, front and rear doors, each door having first and second ends mounted on the side walls for movement between an open position for dumping a load and a closed position for receiving a load, and a floor formed by the first end of the front door engaging the front wall, the second end of the front door engaging the first end of the rear door, and the second end of the rear door engaging the rear wall in the closed position, the method comprising:
   moving the rear door from the rear to the front of the trailer body to dump the load material at the rear of the dump body,
   attaching a pin connected to the rear door to a first hook located on the front door to lock the front door to the rear door,
   moving the front and rear doors from the front to the rear of the trailer body to dump the load material at the front of the dump body,
   moving the front and rear doors from the rear to the front of the trailer body, unlocking the first hook,
   attaching a second hook located on the front door to a pin attached to the trailer frame to hold the front door at the front of the trailer body,
   moving the rear door to the rear of the trailer body to close the rear door and form the floor for accepting and transporting the load material.

* * * * *